United States Patent [19]
Oshima

[11] Patent Number: 5,227,051
[45] Date of Patent: Jul. 13, 1993

[54] SYSTEM FOR PROCESSING ORGANIC WASTE LIQUID

[75] Inventor: Katsutoshi Oshima, Tokyo, Japan

[73] Assignee: Zaidan Hojin Nanyo Kyokai, Tokyo, Japan

[21] Appl. No.: 649,682

[22] Filed: Feb. 1, 1991

[30] Foreign Application Priority Data

Jun. 13, 1990 [JP] Japan .................................. 2-152687

[51] Int. Cl.$^5$ .............................................. C02F 3/06
[52] U.S. Cl. ..................................... 210/137; 210/150; 210/151; 210/201; 210/218
[58] Field of Search ......................... 210/605, 616–618, 210/150, 151, 137, 701, 218, 219, 252, 255, 512.1

[56] References Cited

U.S. PATENT DOCUMENTS

| | | |
|---|---|---|
| 4,256,573 | 3/1981 | Shimodaira et al. ................. 210/618 |
| 4,315,821 | 2/1982 | Climenhage ......................... 210/605 |
| 4,566,971 | 1/1986 | Reimann et al. ..................... 210/616 |
| 4,576,718 | 3/1986 | Reischl et al. ....................... 210/616 |
| 4,582,600 | 4/1986 | Atkinson et al. ..................... 210/151 |
| 4,664,803 | 5/1987 | Fuchs et al. ......................... 210/616 |
| 4,696,747 | 9/1987 | Verstraete et al. ................... 210/617 |
| 4,800,021 | 1/1989 | Desbos ................................ 210/605 |
| 4,983,299 | 1/1991 | Lupton et al. ....................... 210/617 |

Primary Examiner—Thomas Wyse
Attorney, Agent, or Firm—Marshall & Melhorn

[57] ABSTRACT

Waste liquid is cleaned or purified primarily by removing organic contaminants therefrom by combination of a floating filter layer and an anaerobic biological process. The floating filter layer consists of irregularly shaped small pieces of lipophilic substances such as polypropylene and other plastics, and the organic contaminants are on the one hand filtered by this floating filter layer, and on the other hand decomposed on the surface of the small pieces forming the floating filter layer through anaerobic biological process. The system of the present invention is economical to build, and can be used as a part of sewage and waste liquid processing installations either for industrial or for household use.

20 Claims, 2 Drawing Sheets

SYSTEM FOR PROCESSING ORGANIC WASTE LIQUID

TECHNICAL FIELD

The present invention relates to method and system for cleaning or otherwise processing waste liquid, and in particular to such method and system for cleaning waste liquid contaminated by organic wastes.

BACKGROUND OF THE INVENTION

Methods of processing waste liquid with a waste liquid processing system comprising a body of waste liquid, and a floating filter disposed above this waste liquid body and consisting of floating plastic pieces having a specific weight less than that of water are described in U.S. Pat. No. 4,115,266 issued Sep. 19, 1978 to the Inventor of the present application.

The organic waste liquids from the fast food and restaurant industry, the marine product processing industry, and the meat production industry generally contain animal and vegetable oil, and their BOD and COD levels are typically at the extremely high levels of 5,000 to 10,000 mg/liter. Batch processes, lagoons and aeration are typically employed for cleaning such high concentration organic waste liquids. However, in carrying out such processes, the biological process is hampered by the presence of large amounts of oil matters, and the pre-processing such as aggregation/precipitation and/or floatation separation process are therefore indispensable. This calls for a need for large scale facilities, and causes an increase in the running cost. Further, the process is too complex for it to be used in small-scale facilities such as sewage processing systems intended for individual household use.

The methods described in the aforementioned U.S. patent account for organic waste liquids containing large amounts of oil matters, but do not provide that the waste liquid is allowed to move at a speed suitable for anaerobic processes. On the contrary, aeration was considered necessary for promoting aggregation of foreign substances on the particles forming the floating filter layer.

BRIEF SUMMARY OF THE INVENTION

In view of such problems of the prior art, a primary object of the present invention is to provide method of purifying or cleaning waste liquid which can be implemented efficiently and economically.

A second object of the present invention is to provide a method of cleaning organic waste liquid containing oil matters which can eliminate contaminants to a sufficient extent to allow it to be released to rivers and lakes without causing any harm to the natural environment.

The present invention is also directed to systems which are suitable for carrying out such methods.

These and other objects of the present invention can be accomplished by providing a system for processing organic waste liquid, comprising: a vessel which is substantially enclosed to define an internal chamber substantially enclosed to define an internal chamber substantially free from external air supply, and provided with an inlet and an outlet for inflow and outflow of waste liquid into and out of said vessel, respectively; a floating filter layer separating the interior of said vessel into two parts communicating with said inlet and said outlet, respectively, said floating filter layer consisting of pieces, particles or flakes of material having a true or apparent specific gravity substantially equal to or less than that of said waste liquid; and means for keeping said floating filter layer within a prescribed part of said inner chamber; a flow rate of said waste liquid passing through said vessel being so determined as to allow said waste liquid to stay in said vessel at least for one hour, preferably at least for three hours. The waste liquid may be passed through the floating filter layer either as an upward flow or as a downward flow.

In the case of a downward flow, substances to be separated having lower specific densities than waste liquids such as frying oil and so on contained in the waste liquid grow into particles of larger sizes on the surfaces of the pieces, blocks or small molded pieces forming the floating filter layer, and are thereby separated from the waste liquid to be expelled from an upper part of the vessel, along with gasified substances, by suitable means such as a pump for pumping up the oil forming a layer in the uppermost level or any commercially available oil absorbing agents.

Emulsified oil containing SS (suspended solids) and detergents is converted into substances having low molecular weights such as acetic acid butyric acid and propionic acid in the floating filter layer and in other parts of the interior of the vessel by anaerobic bacteria.

In the case of an upward flow, a similar anaerobic process is carried out in the sludge at the bottom of the vessel as well as in the floating filtering layer by anaerobic bacteria which have multiplied therein. The amount of microbes (MLSS) in these contact media can reach in excess of 10,000 mg/liter, and this significantly contributes to the process of decomposition.

In either case, the floating layer of the plastic pieces, which may be in the form of foamed plastic pieces, is swollen by SS and oil matters to thereby prevent clogging, and very little sludge is produced since most of the organic substances are converted into acids. Therefore, very little maintenance work is required, and the running cost can be minimized.

If the concentration of the oil matters including emulsion is 100 to 2,000 mg/liter, 80% thereof can be recovered when the filtering layer is approximately 1 meter in thickness, and it is possible to reduce the contamination level down to 30 mg/liter. It means that this method is a highly economical and simple processing method not requiring injection of any chemical agents because the permissible level of waste liquid which is allowed to be released to the sewage is typically 30 mg/liter.

Since the high concentration organic waste liquid from which 80% of the oil matters has been removed is then passed through a layer of high concentration anaerobic bacteria layer so that BOD, COD and SS may be removed therefrom by 80% or more, an ultimate removal ratio of 95% or higher may be achieved for BOD, COD and SS in a short time by combining an aerobic bacteria process using a vessel containing a floating layer of pieces, blocks or molded pieces as a secondary processing step. However, in this case, it is necessary to adjust the pH level. This two-step process is highly effective when the waste liquid is to be released to rivers and lakes.

In addition to the fact that the method of the present invention allows reduction of BOD and COD loads by removing substances having lower specific weights such as oil matters and gases, and the speed up of decomposition of organic matters by maintaining the anaerobic bacteria at high level, the rise in the temperature of the waste liquid due to the bacterial fermentation further speeds up decomposition. In the case of organic waste water from a household containing a high concentration of oil matters, even when the temperature of the original waste water was 7° C. on average, the temperature of the processing vessel was always maintained at 20° to 21° C., and it promoted the decomposition of the organic matters. At the same time, methane gas was generated by methane bacteria, and an efficient utilization of energy was made possible by recovering this methane gas in addition to the oil matters. The vessel may be heated to 30° to 35° C. to efficiently recover the methane gas.

As a means for slightly stirring the sludge settling at the bottom of the vessel, the waste liquid inlet for introducing the waste liquid into the vessel may be located in a side portion of the vessel at a level near the bottom of the vessel, preferably defining a certain angle relative to a horizontal plane.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
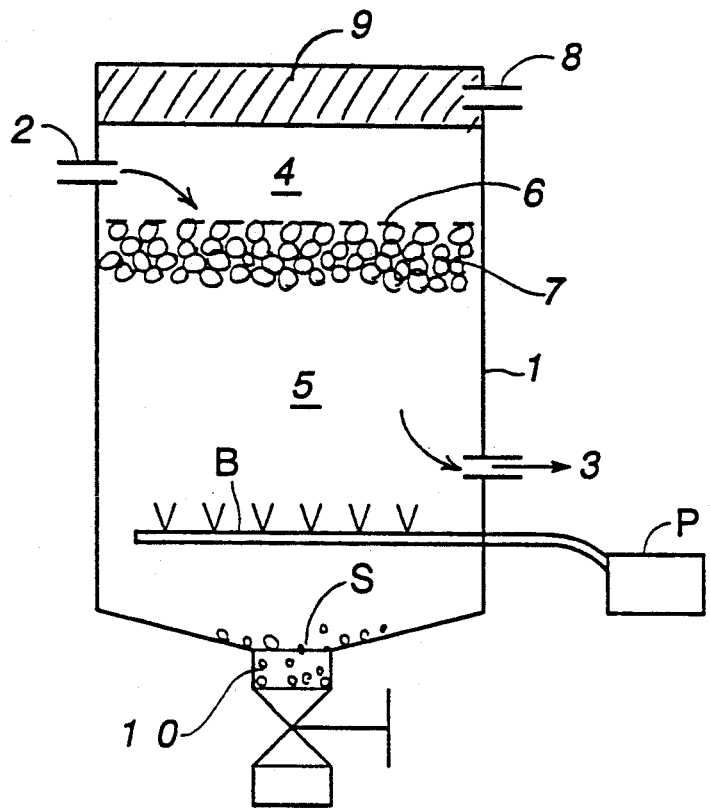
FIGS. 1 and 2 are sectional views of concrete examples of the upward flow and downward flow systems, respectively, which may be used for carrying out the method of the present invention.

FIG. 1 shows a first embodiment of the floating filter waste liquid processing system according to the present invention. This system comprises a cylindrical vessel 1 which is provided with an inlet 2 defined in a side wall portion of an upper part of the vessel 1, and an outlet 3 defined in a side wall portion of a lower part of the vessel 1. The interior of the vessel 1 is separated into an upper chamber 4 and a lower chamber 5 by a sieve or grid 6 of wire mesh extending over the entire cross section of the vessel 1.

This grid 6 confines a floating filter layer 7 formed by particles or flakes made of a lipophilic substance, such as atactic polypropylene, atactic ethylene propylene co-polymer, porous polyethylene, tactic polypropylene, styrene foam, urethane polymer flakes, urethane foam pieces and other plastic materials having a true or apparent specific weight substantially equal to or less than that of the waste liquid, immediately below this grid 6. These particles or flakes are irregularly shaped so that formation of straight paths for the waste liquid may be avoided, and a favorable contact between the surfaces of the particles or flakes and the waste liquid may be achieved. To achieve a favorable contact between the surfaces of the particles forming the floating filter layer 7 and the contaminants, the particles of the floating filter layer are allowed to move freely insofar as allowed by the grid 6. The inlet 2 may define a certain angle relative to the radial line as seen on a horizontal plane or projection so that a favorable contact between the surfaces of the particles forming the floating filter layer 7 and the contaminants may be achieved without increasing the flow rate of the waste liquid flowing through the vessel 1. As shown in FIG. 1, the lower chamber 5 is substantially larger than the upper chamber 4. However, the floating filter layer 7 may extend to the uppermost part of the vessel 1.

For other details and possible variations of this floating filter layer, reference is made to the aforementioned U S. Pat. No. 4,115,266 which is herein incorporated by reference.

The vessel 1 is further provided with a second outlet 8 near its uppermost part thereof for removing oil and other substances having a specific weight smaller than that of the waste liquid, and a third outlet 10 provided in a bottom wall of the vessel for removing sludge and other substances having a specific weight larger than that of the waste liquid and tending to settle in the bottom of the vessel. The vessel 1 is optionally provided with backwash pipes B which are connected to a pump P for backwashing the floating filter layer 7 with cleaning liquid from time to time.

According to this embodiment, the waste liquid is introduced from the upper inlet 2, and is filtered by the floating filter layer 7. The oily substances in the influent in the form of relatively large particles simply rise to an upper part of the vessel 1 and forms an oil layer 9 which can be removed, along with gaseous substances, from the second outlet 8. The oily substances in the form of small particles or emulsions are absorbed by the floating filter layer 7 by adhering to the surface of the small particles of the plastic material forming the floating filter layer 7, and either grow into larger particles which eventually move upward into the oil layer 9 or decomposed into acids by the action of anaerobic bacteria on the surface of the small particles of the plastic material forming the floating filter layer 7.

Solid and heavy substances settle in the bottom portion of the vessel 1, and can be removed from the third outlet 10 as required.

In order for a satisfactory anaerobic biological process to be carried out in this vessel, the waste liquid is required to stay in the vessel, either within the floating filter layer 7, in the body of waste liquid downstream thereto or in the sludge settling in the bottom, for a sufficient time period. For practical purpose, this time period should be at least one hour, preferably three hours or more.

Figure 2:
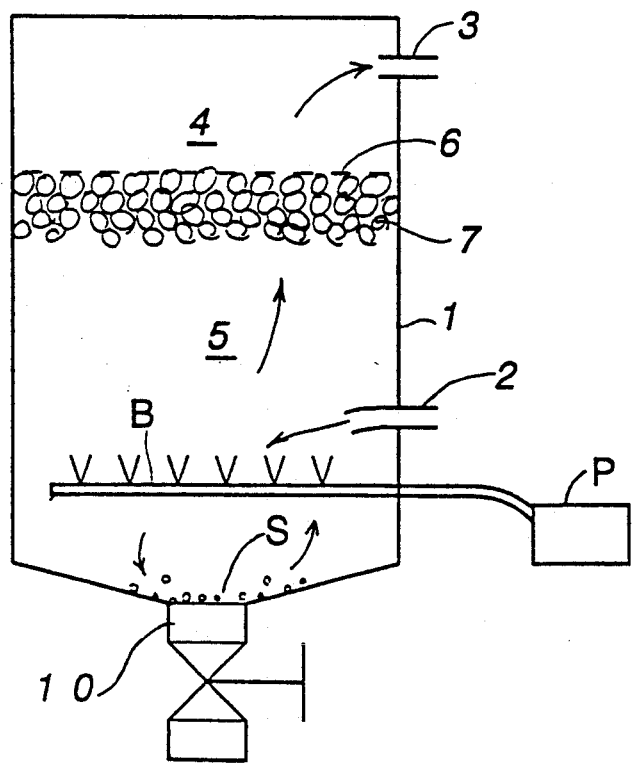

FIG. 2 shows a second embodiment of the floating filter waste liquid processing system according to the invention. The parts corresponding to those of the previous embodiment are denoted with like numerals. This system also comprises a cylindrical vessel 1 which, however, angel is provided with an inlet 2 in a side wall portion of a lower part of the vessel 1, and an outlet 3 in a side wall portion of an upper part of the vessel 1. The vessel 1 is separated into an upper chamber 4 and a lower chamber 5 by a grid 6 similar to the grid 6 of the first embodiment which confines a floating filter 7 in a manner similar to that of the first embodiment. This vessel 1 is also provided with an outlet 10 for removal of sludge in its bottom wall.

According to this embodiment, the waste liquid introduced from the inlet 2 into the vessel 1 is passed through the floating filter layer 7, and is expelled from the upper outlet 3. Sludges and other heavy substances settle in the bottom portion of the vessel 1, and are eventually removed from the bottom outlet 10. Since the sludge provides a large surface area for anaerobic biological process, an active decomposition of organic substances takes place in the bottom region. To further promote this effect, the inlet 2 may define a certain angle relative to a horizontal plane to slightly stir the sludge, and a certain angle relative to a radial line as seen on a horizontal place of projection to promote the contact between the contaminants and the surface areas of the elements forming the floating filter layer 7.

Figure 3:
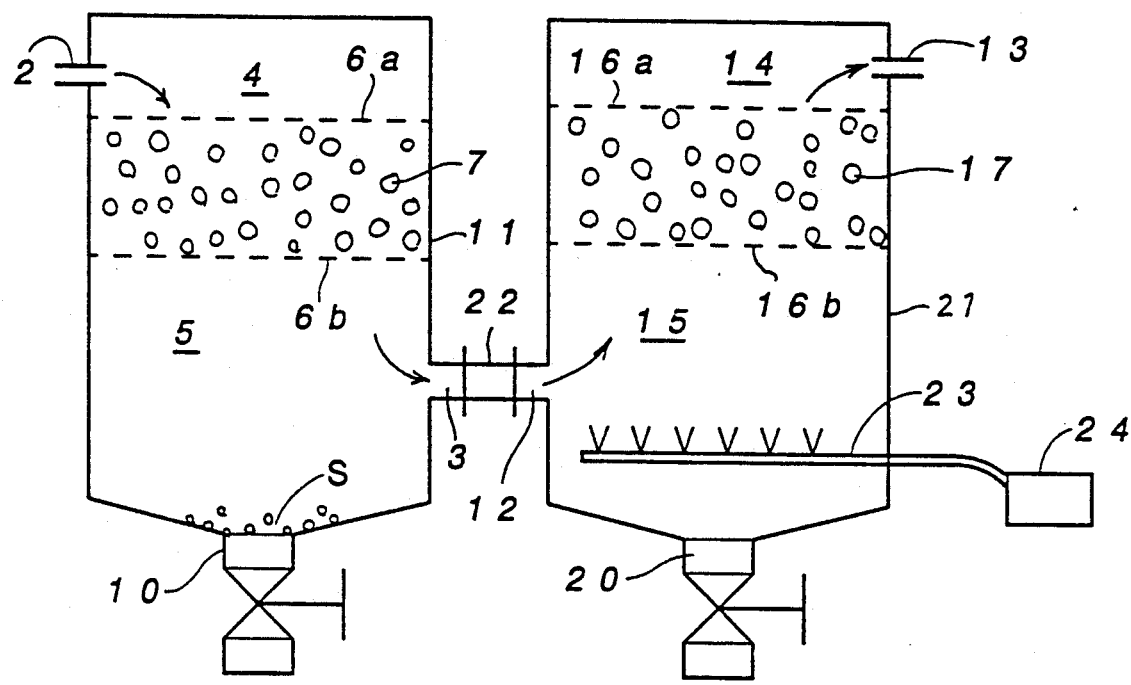
FIG. 3 is a sectional view of yet another concrete example of the system which is additionally provided with a second processing vessel for an upward flow aerobic process as a secondary stage.

FIG. 3 shows a third embodiment of the floating filter waste liquid processing system according to the invention. This system combines an anaerobic biological process using a floating filter layer, and an aerobic biological process to further improve the capability of the system to process waste liquid, and includes two vessels 11 and 21 for the anaerobic and aerobic processes, respectively.

The first vessel 11 is similar to the vessel 1 of the first embodiment. As a matter of fact, the first vessel 11 may have a structure identical to that of the vessel 1 of the first embodiment. The vessel 11 illustrated in FIG. 3 is provided with a pair of grids 6a and 6b which confine a floating filter layer 7 from above and below. The lower grid 6b ensures that the particles or flakes of the floating filter layer 7 be not washed away by the flow of the waste liquid.

The second vessel 21 is provided with an inlet 12 in a side wall portion of a lower part thereof for introducing the effluent waste liquid from the outlet 3 of the first vessel 11 into the second vessel 21, via a conduit 22, and an outlet 13 in a side wall portion of an upper part of the vessel 21 for expelling the waste liquid from the second vessel. The second vessel 21 is also provided with a floating filter layer 17 confined from above and below similar to that provided in the first vessel, and is additionally provided with aeration pipes 23 having air jet nozzles and connected to an air pump 24 for aerating the liquid content of the second vessel 21 by introducing air or oxygen particles thereinto.

According to the third embodiment, the waste liquid is subjected to an anaerobic biological process in the first vessel 11 in the same way as in the first embodiment, and is then subjected to an aerobic biological process in the second vessel 21. The aerobic biological process is carried out primarily on the surfaces of the particles or flakes forming the floating filter layer, and the oxygen required for this process is supplied by the air particles released from the aeration pipes.

EXAMPLE 1

Processing of Household Sewage (Separation of Foreign Matters and Anaerobic Bacteria Process)

Waste liquid processing tests were conducted on a sewage disposal system for a household of a seven-member family, by using a system according to the present invention which includes cylindrical vessel 370 mm in diameter and 1 meter in height, with a filter layer 40 cm in height and the waste liquid flowing downward in the vessel.

TABLE 1

| Item | Original water | Processed water |
|---|---|---|
| oil matters (mg/liter) | 300 | 3 or less |
| COD (mg/liter) | 2,650 | 116 |
| BOD (mg/liter) | 9,120 | 470 |
| SS (mg/liter) | 8,000 | 161 |
| pH | 6.1 | 4.5 |
| temperature (°C.) | 7 | 21 |

Because the organic substances were mostly decomposed into acids, the pH level of the waste water was reduced from 6.1 to 4.5. Approximately 80% of the oil matters at the level of 300 mg/liter floated and separated, and the level was reduced to 3 mg/liter at the outlet end. COD and BOD were also reduced below 90%. The measurements were taken short time after the noon peak (2:00 PM). The data obtained in the evening including the removal ratios were substantially the same.

In normal households, the flow rate of the sewage peaks in the morning, at noon and in the evening, and the capacity of the system should be determined so that the waste liquid may be subjected to the anaerobic process for a sufficient time period. For a satisfactory anaerobic process to be carried out, the waste liquid should stay in the system at least for more than one hour, preferably for about three hours or more.

EXAMPLE 2

Processing of Waste Liquid Produced by Fish Processing (Separation of Foreign Matters/Anaerobic Process and Aerobic Process)

The system used for the tests on the processing of waste liquid from a fish processing plant was constructed by using a-cylindrical vessel 520 mm in diameter and 3 meters in height with the waste liquid flowing downward and a filter layer 2 meters in height, and another vessel 300 mm in diameter and 3 meters in height using a filter layer 2 meters in height with the waste liquid flowing upward in the vessel. The first vessel was intended for oil/water separation and an anaerobic processing of the waste liquid, and the second vessel was intended for an additional aerobic process. The water temperature was 20° C. on average.

A floatation separation used to be indispensable in the case of processing waste liquid produced by fish processing, but a direct bacteria process was carried out in the second vessel using a plastic foam piece aggregate layer located under a means for preventing floatation of plastic pieces consisting of a 5 mm pitch screen without using any floatation separation process.

Since the flow rate was 2 m/hour, the anaerobic contact process lasted three hours, and the aerobic contact process lasted one hour.

TABLE 2

| Item | Original water | Processed water |
|---|---|---|
| oil matters (mg/liter) | 520 | 3 or less |
| COD (mg/liter) | 1,620 | 30 or less |
| BOD (mg/liter) | 5,300 | 20 or less |
| SS (mg/liter) | 520 | 20 or less |

According to this process, even the requirements to reduce the BOD level below 10 mg/liter before releasing the waste liquid to rivers can be met easily by adding the second vessel for aerobic processing. In this case, a pH level adjustment was carried out following the anaerobic process.

EXAMPLE 3

Processing Waste Liquid from Cattle Sheds

Since the waste liquid contained fairly high levels of BOD and COD, the processing was carried out in a vessel 300 mm in diameter and 3 meters in height using an upward flow and a filter layer thickness of 1 meter. With the anaerobic bacteria multiplied to a sufficient extent and the in-flow angle set at 30 degrees to ensure a sufficient contact with the precipitated sludge, the waste liquid was passed through the floating layer. The water temperature during this process was 19° C. on average, and the resident time in the processing vessel was set at three hours.

TABLE 3

| Item | Original water | Processed water |
| --- | --- | --- |
| COD (mg/liter) | 520 | 30 or less |
| BOD (mg/liter) | 267 | 30 or less |
| SS (mg/liter) | 370 | 20 or less |

A normal anaerobic process requires a contact time of 10 to 20 hours in order to accomplish removal ratios for COD and BOD near 90%, but this process accomplished this goal in only three hours. The produced gas was recovered from an upper part of the vessel, and was allowed to be utilized for useful purposes.

Although the present invention has been described in terms of specific embodiments, it is possible to modify and alter details thereof without departing from the spirit of the present invention.

What we claim is:

1. A biological system for processing organic waste liquid, comprising:
   a vessel having a sidewall and which vessel is substantially enclosed to define an inner chamber substantially free from external air supply and in which an anaerobic biological process is intended to take place, said vessel provided with an inlet and an outlet for inflow and outflow of waste liquid into and out of said vessel, respectively;
   aqueous liquid waste in the vessel;
   a floating filter layer in the aqueous liquid separating the interior of said vessel into two parts communicating with said inlet and said outlet, respectively, said floating layer being substantially horizontal and extending to the interior of the sidewall, said floating filter layer consisting of irregularly shaped pieces, particles or flakes of material having a true or apparent specific gravity substantially equal to or less than that of said waste liquid;
   bacteria in the floating layer; and
   grid means adjacent the filter layer for keeping said floating filter layer substantially submerged below a surface level of said waste liquid in said vessel, the grid means being substantially horizontal and extending to the interior of the sidewall;
   a flow rate of said waste liquid passing through said vessel being so determined as to allow said waste liquid to stay in said vessel at least for one hour.

2. A system according to claim 1, including means for controlling the flow rate of said waste liquid passed through said vessel so that said waste liquid stays in said vessel at least for three hours.

3. A system according to claim 1, wherein said floating filter layer separates said internal chamber into upper and lower chambers, and said inlet is provided above said floating filter layer while said outlet is provided below said floating filter layer.

4. A system according to claim 3, wherein said vessel is provided with an outlet in an uppermost part of said vessel for expelling gaseous substances out of said vessel.

5. A system according to claim 3, wherein said vessel is provided with an outlet in an uppermost part of said vessel for removing liquid substances which are collected in an upper part of said internal chamber.

6. A system according to claim 3, wherein said vessel is provided with an outlet in a lowermost part of said vessel for removing heavier substances which are collected in a lower part of said internal chamber.

7. A system according to claim 3, wherein said vessel is provided with a vertically disposed cylindrical shape, and an inflow of said liquid waste from said inlet defines a certain angle with respect to a radial line as seen on a horizontal plane of projection and/or a vertical plane of projection.

8. A system according to claim 3, further comprising a second vessel for carrying out an aerobic biological process connected to said outlet.

9. A system according to claim 8, wherein said second vessel is provided with means for introducing air or oxygen thereinto for aeration of waste liquid received therein.

10. A system according to claim 8, wherein said second vessel is also provided with a floating filter layer.

11. A system according to claim 1, wherein said floating filter layer separates said internal chamber into upper and lower chambers, and said inlet is provided below said floating filter layer while said outlet is provided above said floating filter layer.

12. A system according to claim 11, wherein said inlet provided below said floating filter layer for introducing waste liquid into said inner chamber defines a certain angle with respect to a horizontal plane to stir heavy substances settling in a lower part of said inner chamber.

13. A system according to claim 11, wherein said vessel is provided with an outlet in an uppermost part of said vessel for expelling gaseous substances out of said vessel.

14. A system according to claim 11, wherein said vessel is provided with an outlet in an uppermost part of said vessel for removing liquid substances which are collected in an upper part of said internal chamber.

15. A system according to claim 11, wherein said vessel is provided with an outlet in a lowermost part of said vessel for removing heavier substances which are collected in a lower part of said internal chamber.

16. A system according to claim 11, wherein said vessel is provided with a vertically disposed cylindrical shape, and an inflow of said liquid waste from said inlet defines a certain angle with respect to a radial line as seen on a horizontal plane of projection and/or a vertical plane of projection.

17. A system according to claim 1, wherein said floating filter layer fills up said inner chamber up to an uppermost part thereof, and said means for keeping said floating filter layer within a prescribed part of said inner chamber prevents said floating filter layer from flowing out of said inner chamber.

18. A system according to claim 1, further comprising a second vessel for carrying out an aerobic biological process connected to said outlet.

19. A system according to claim 18, wherein said second vessel is provided with means for introducing air or oxygen thereinto for aeration of waste liquid received therein.

20. A system according to claim 18, wherein said second vessel is also provided with a floating filter layer.